(12) United States Patent
Lee et al.

(10) Patent No.: US 8,807,488 B2
(45) Date of Patent: Aug. 19, 2014

(54) MOUNTING APPARATUS FOR STORAGE DEVICE

(75) Inventors: Guang-Yao Lee, New Taipei (TW); Chien-Li Tsai, New Taipei (TW); Jie Wang, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 92 days.

(21) Appl. No.: 13/525,383

(22) Filed: Jun. 18, 2012

(65) Prior Publication Data
US 2013/0270406 A1  Oct. 17, 2013

(30) Foreign Application Priority Data

Apr. 11, 2012 (CN) .......................... 2012 1 0104602

(51) Int. Cl.
*G12B 9/00* (2006.01)
(52) U.S. Cl.
USPC ............... 248/27.1; 248/222.51; 361/679.33; 361/679.58; 361/825
(58) Field of Classification Search
CPC .... G06F 1/187; G11B 33/124; G11B 33/128; H05K 7/1411
USPC ..................... 248/27.1, 201, 220.22, 222.51; 361/679.31, 610, 679.02, 679.33, 361/679.58, 726, 727, 825
See application file for complete search history.

(56) References Cited

U.S. PATENT DOCUMENTS

| | | | | |
|---|---|---|---|---|
| 5,680,293 | A * | 10/1997 | McAnally et al. | ........ 361/679.31 |
| 6,483,696 | B1 * | 11/2002 | Gan | .............................. 361/610 |
| 6,616,106 | B1 * | 9/2003 | Dean et al. | .................... 248/27.1 |
| 6,625,014 | B1 * | 9/2003 | Tucker et al. | ............ 361/679.34 |
| 6,816,367 | B2 * | 11/2004 | Liu et al. | .................. 361/679.33 |
| 7,090,528 | B2 * | 8/2006 | Tuttle et al. | .................... 439/383 |
| 7,440,271 | B2 * | 10/2008 | Chen et al. | ............... 361/679.33 |
| 7,697,279 | B2 * | 4/2010 | Yeh et al. | ................. 361/679.39 |
| 8,379,380 | B2 * | 2/2013 | Zhang | ....................... 361/679.33 |
| 8,432,670 | B2 * | 4/2013 | Chen | ......................... 361/679.02 |
| 8,550,414 | B2 * | 10/2013 | Chen et al. | .................. 248/276.1 |
| 2003/0155471 | A1 * | 8/2003 | Dean et al. | .................... 248/27.1 |
| 2005/0051672 | A1 * | 3/2005 | Dean et al. | .................... 248/27.1 |
| 2007/0014085 | A1 * | 1/2007 | Meserth et al. | ................ 361/685 |
| 2009/0273901 | A1 * | 11/2009 | Jaramillo et al. | ......... 361/679.58 |
| 2012/0056515 | A1 * | 3/2012 | Chen et al. | .................. 312/223.2 |
| 2012/0087084 | A1 * | 4/2012 | Nguyen et al. | ............ 361/679.37 |
| 2012/0243167 | A1 * | 9/2012 | Chen et al. | ............... 361/679.31 |
| 2013/0163182 | A1 * | 6/2013 | Guo et al. | ................ 361/679.33 |

* cited by examiner

*Primary Examiner* — Bradley Duckworth
(74) *Attorney, Agent, or Firm* — Novak Druce Connolly Bove + Quigg LLP (57) ABSTRACT

A mounting apparatus for a storage device includes a positioning bracket, a receiving bracket receiving the storage device, and a rotating member. The positioning bracket includes two opposite end walls each defining a slide slot and forming a guiding pin. The receiving bracket includes two opposite side plates each forming a positioning pin. Each positioning pin is slidably received in the corresponding slide slot. The rotating member includes two rotating plates rotatably connected to the side plates of the receiving bracket. Each rotating plate defines a guiding slot with a positioning portion. The guiding pins are slidably received in the corresponding guiding slots. The positioning pins are slid along the slide slots of the positioning bracket, until the guiding pins are positioned in the corresponding positioning portions.

16 Claims, 7 Drawing Sheets

MOUNTING APPARATUS FOR STORAGE DEVICE

BACKGROUND

1. Technical Field

The present disclosure relates to mounting apparatus, and particularly to a mounting apparatus for a storage device.

2. Description of Related Art

In an electronic device, optical disk drives are usually secured in a chassis of the electronic device by a plurality of fasteners, such as screws. However, it is time-consuming and often difficult to assemble or disassemble the optical disk drives to or from the electronic device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one."

Figure 1:
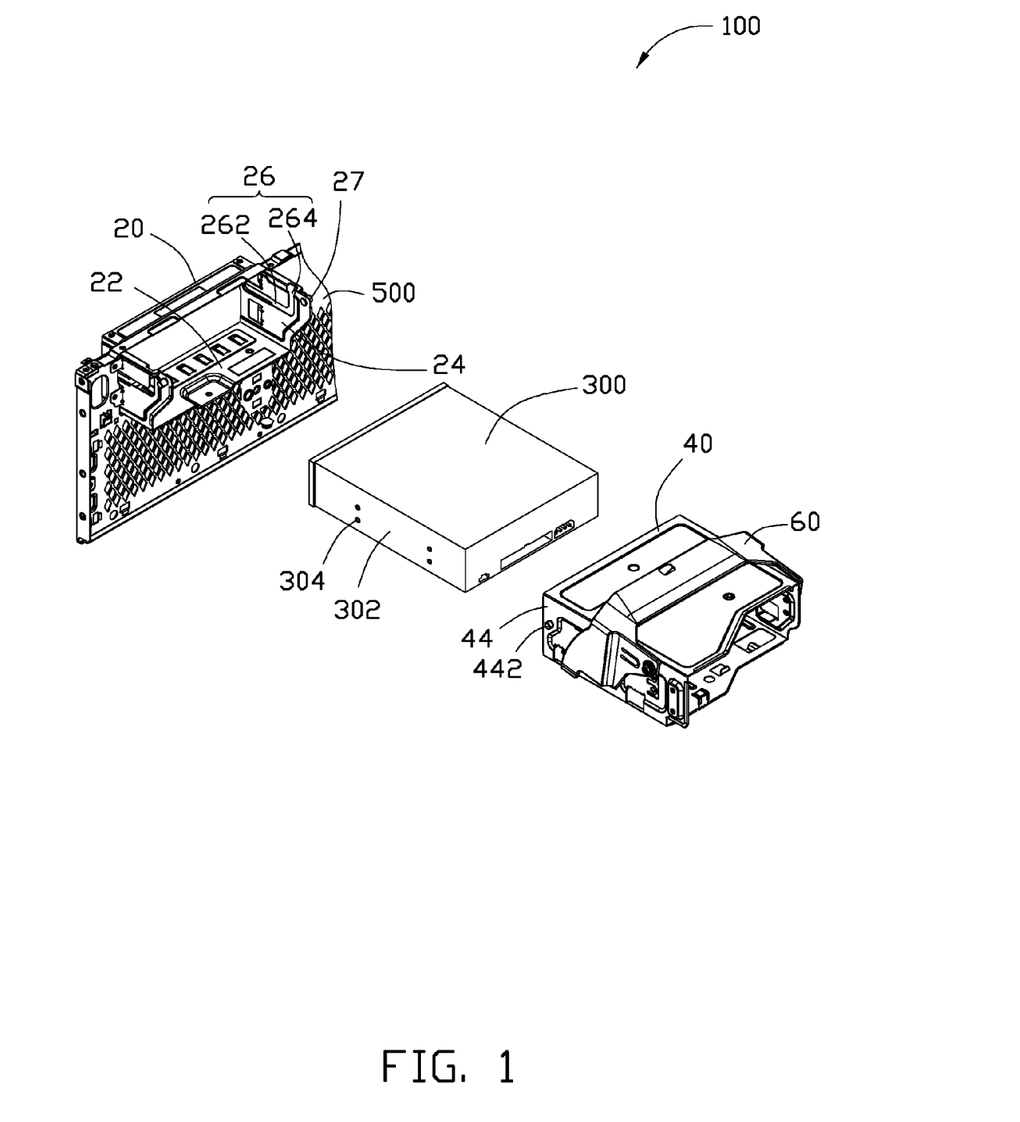
FIG. 1 is an exploded, isometric view of an exemplary embodiment of a mounting apparatus for mounting a storage device, such as an optical disk drive, wherein the mounting apparatus includes a receiving bracket and a rotating member.

FIG. 1 shows an exemplary embodiment of a mounting apparatus 100 provided for mounting a storage device, such as an optical disk drive 300. The optical disk drive 300 includes two opposite sidewalls 302 each defining a plurality of fastening holes 304. The mounting apparatus 100 includes a positioning bracket 20 fastened in an opening of a chassis 500, a receiving bracket 40, and a rotating member 60.

The positioning bracket 20 is substantially U-shaped, and includes a rectangular bottom wall 22 and two end walls 24 extending up from two opposite ends of the bottom wall 22. Two opposite upper portions of the end walls 24 each define a slide slot 26. Each slide slot 26 is substantially L-shaped, and includes a slide portion 262 extending along a direction parallel to the bottom wall 22, and an inserting portion 264 extending up from a rear end of the slide portion 262 and extending through a top side of the corresponding end wall 24. A guiding pin 27 perpendicularly extends out from a rear end of each end wall 24 adjacent to the corresponding inserting portion 264.

Figure 2:
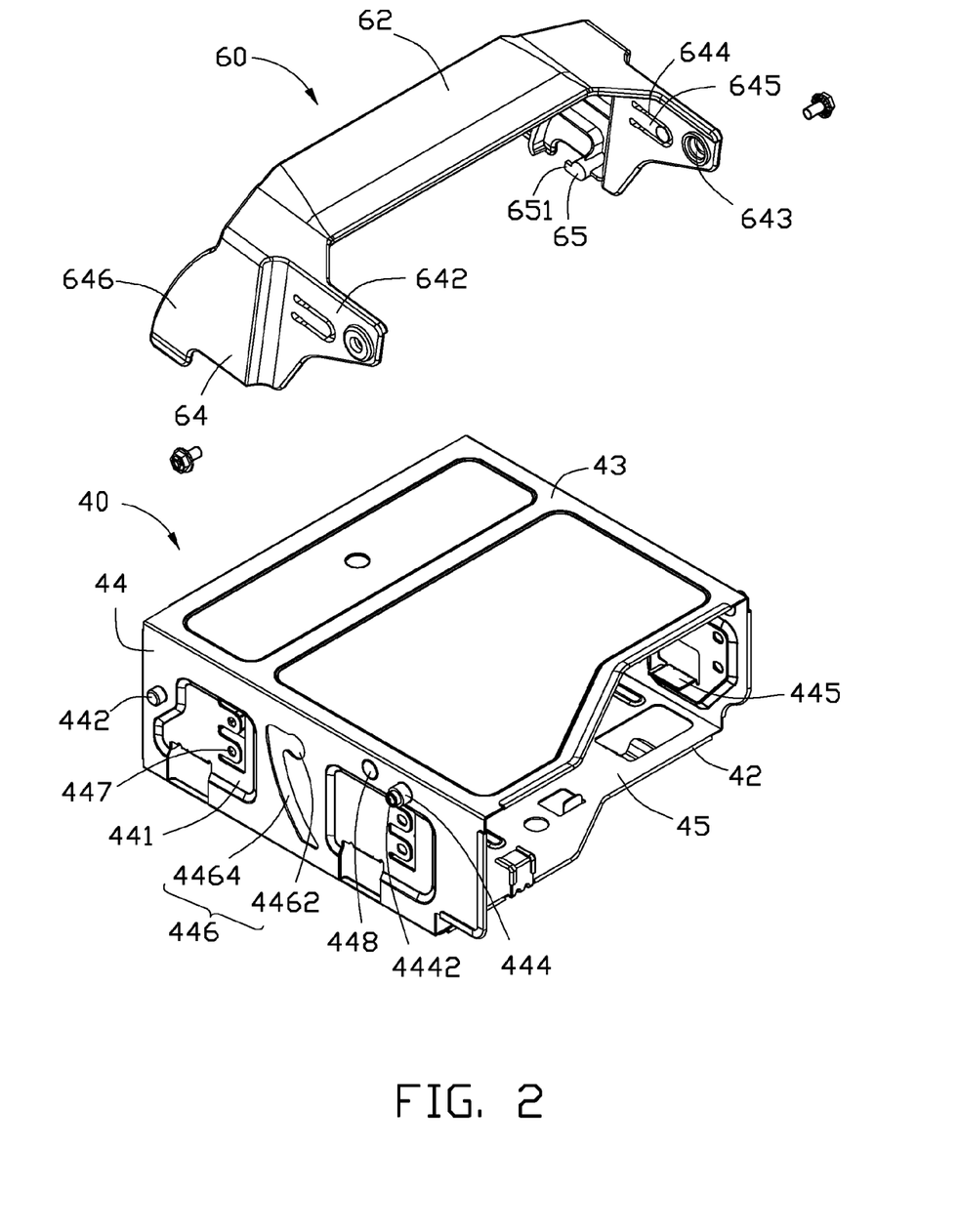
FIG. 2 is an exploded, isometric view of the receiving bracket and the rotating member of FIG. 1.
Figure 3:
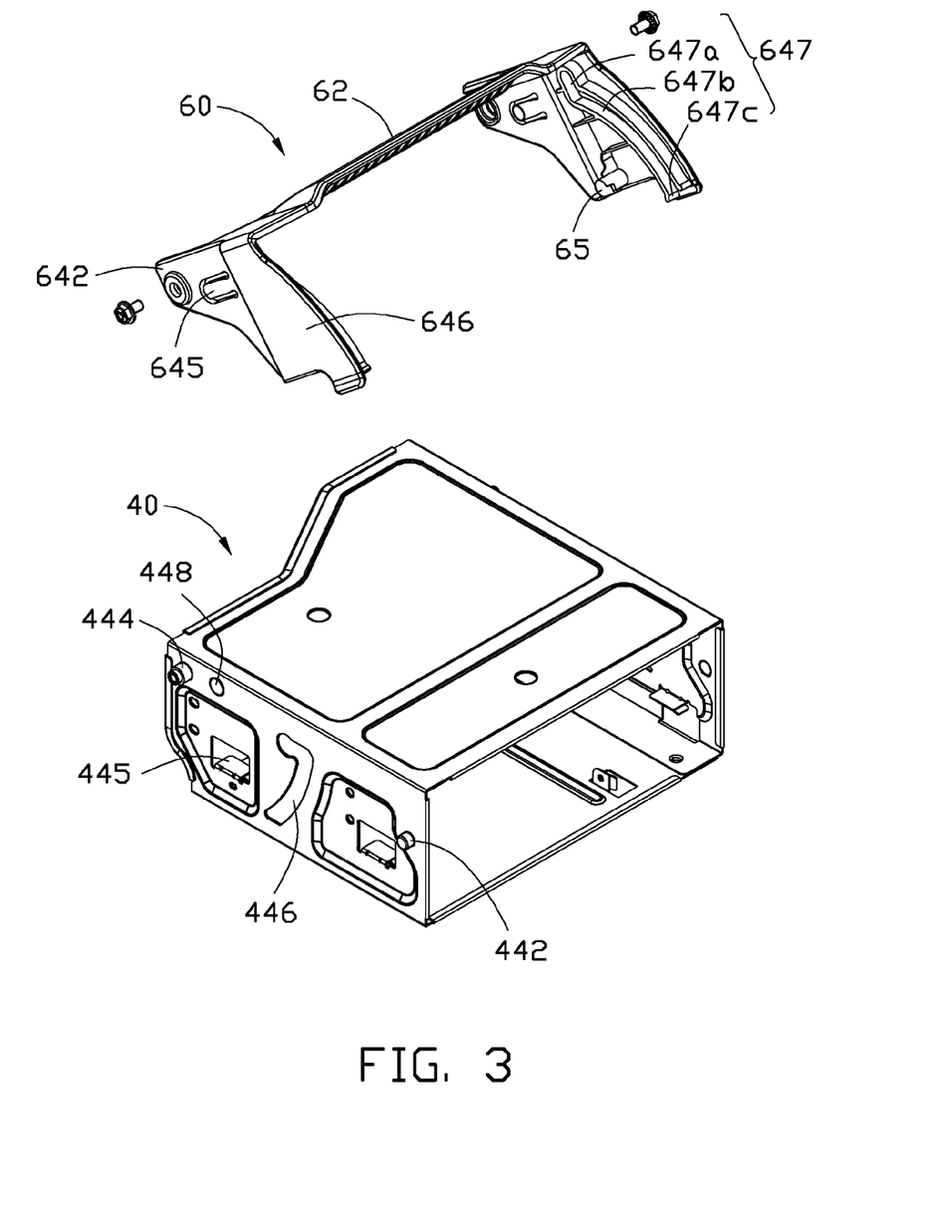
FIG. 3 is similar to FIG. 2, but viewed from another perspective.
Figure 4:
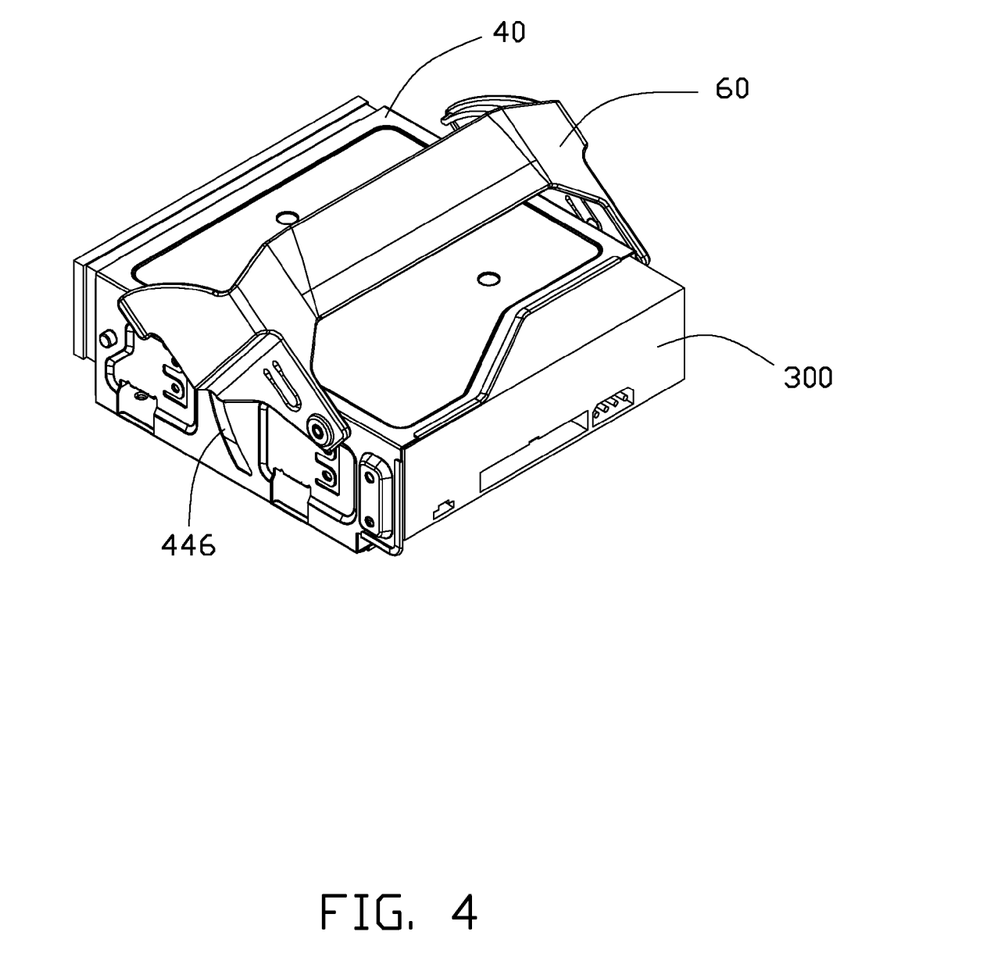
FIG. 4 is an assembled, isometric view of the receiving bracket, the rotating member, and the optical disk drive of FIG. 1.
Figure 5:
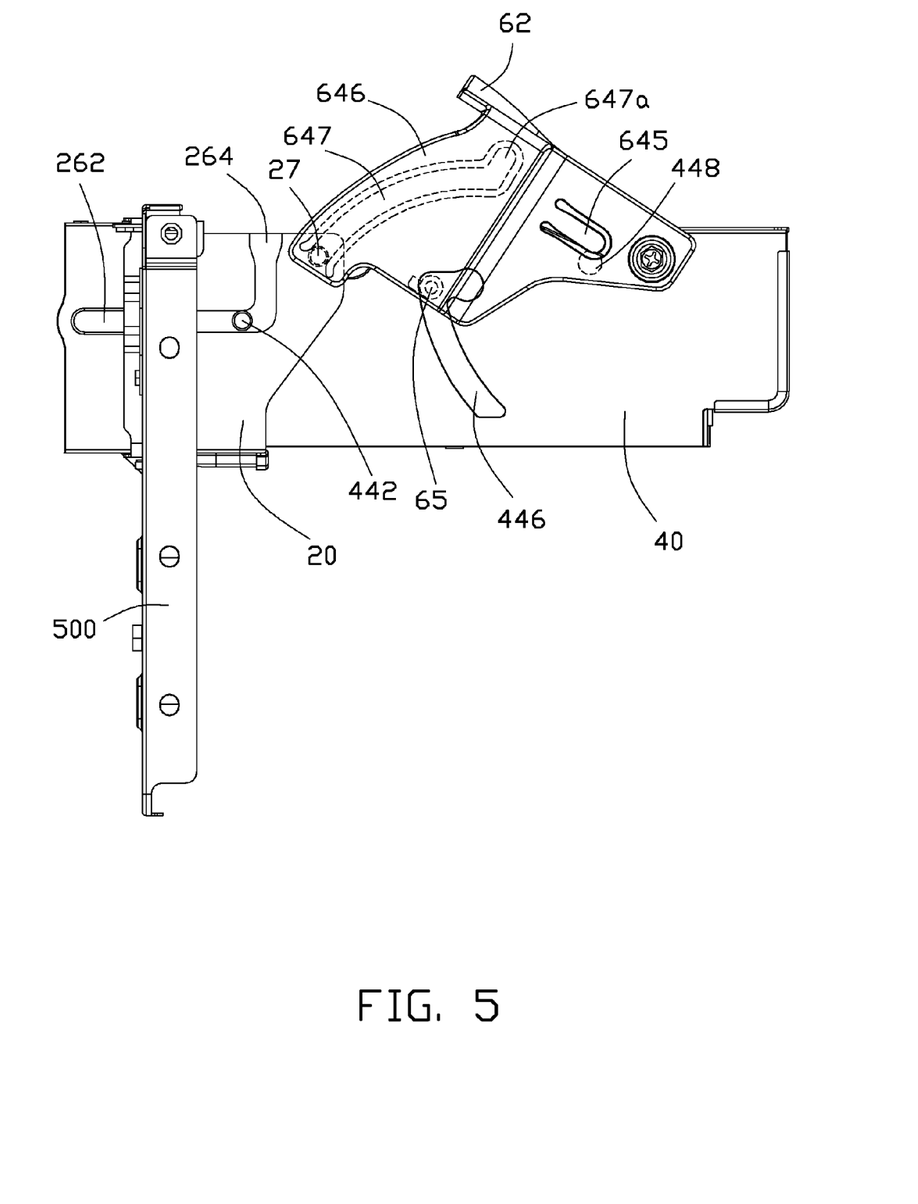
FIGS. 5 and 6 are plan views of the processes of assembling the optical disk drive to the mounting apparatus.
Figure 6:
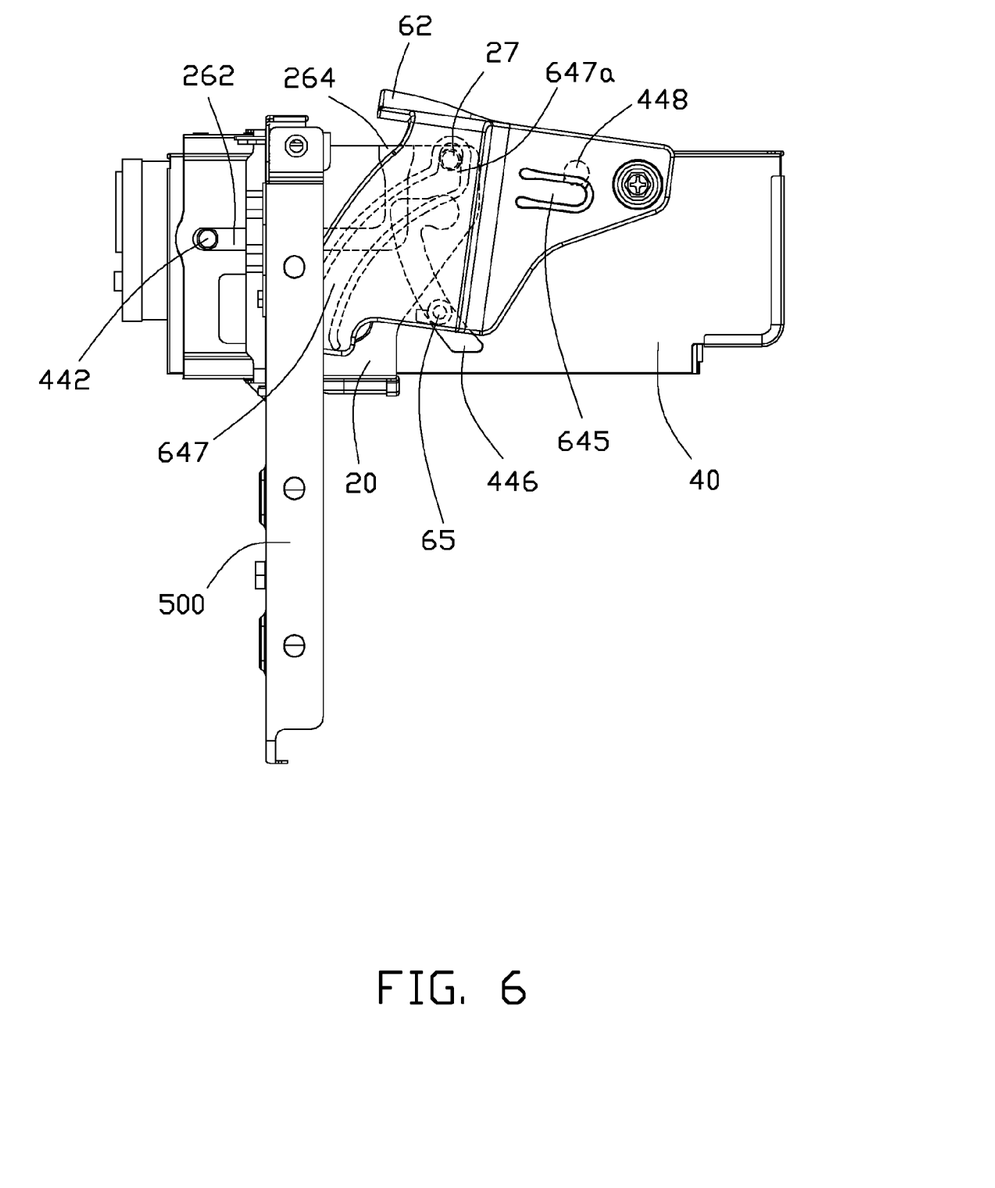
Figure 7:
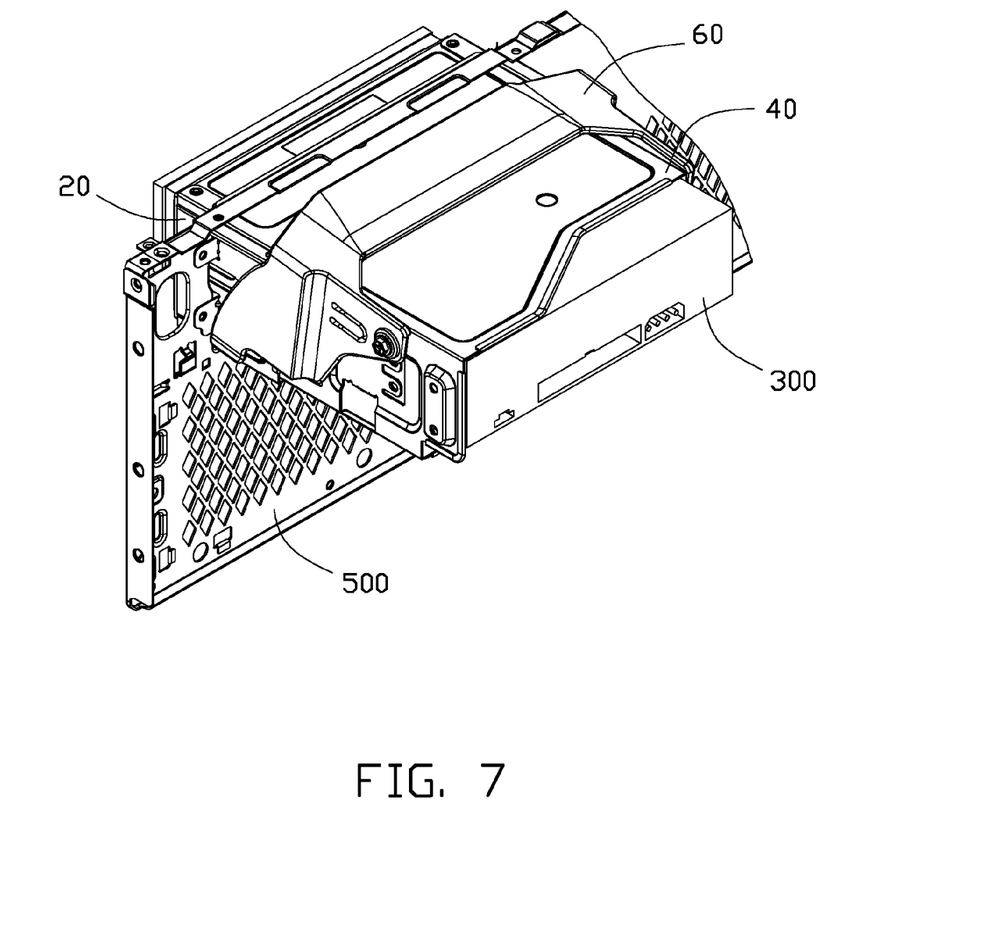
FIG. 7 is an assembled, isometric view of the mounting apparatus of FIG. 1.

FIGS. 2 and 3, show the receiving bracket 40 including a rectangular bottom plate 42, two side plates 44 perpendicularly extending up from two opposite sides of the bottom plate 42, and a top plate 43 connected between top sides of the side plates 44. The bottom plate 42, the side plates 44, and the top plate 43 cooperatively bound a receiving space 45. A positioning pin 442 extends out from a middle of a front end of each side plate 44. Two opposite shafts 444 extend out from upper portions of rear ends of the side plates 44, respectively. Each shaft 444 axially defines a screw hole 4442. Two spaced recessed portions 441 are defined in an outer surface of each side plate 44. A tab 445 perpendicularly extends in from a lower portion of each recessed portion 441. The tabs 445 are coplanar. Each recessed portion 441 defines a plurality of through holes 447. Each side plate 44 defines a positioning slot 446 between the recessed portions 441. Each positioning slot 446 includes an access 4462 defined in an upper portion of the side plate 44 and parallel to the top plate 43, and a positioning portion 4464 obliquely extending down from a front end of the access 4462. A circular protrusion 448 protrudes out from each side plate 44, at a front side of the corresponding shaft 444.

The rotating member 60 is substantially U-shaped, and includes a long operation plate 62 and two resilient rotating plates 64 extending down from two opposite ends of the operation plate 62. A limiting pole 65 extends in from a lower portion of an inner surface of each rotating plate 64. An engaging piece 651 extends forward from a distal end of each limiting pole 65, parallel to the rotating plate 64. An extending portion 642 extends rearward from a rear side of each rotating plate 64. Two opposite shaft holes 643 are defined in rear ends of the extending portions 642. Each extending portion 642 defines a rectangular hole 644 along an extending direction of the extending portion 642. An elastic piece 645 extends rearward from a front end wall bounding of the hole. A guide portion 646 extends forward from a front side of each rotating plate 64. A guiding slot 647 is defined in an inner surface of each guide portion 646. Each guiding slot 647 includes a positioning portion 647a extending down from an upper portion of the corresponding guide portion 646 along a direction perpendicular to the operation plate 62, and an arched slide portion 647b extending forward and down from a bottom end of the positioning portion 647a. An opened inserting portion 647c is formed at a distal end of the slide portion 647b opposite to the positioning portion 647a.

In the embodiment, the rotating member 60 is made of resilient material, such as plastic, and is integrally formed.

FIGS. 4-7, show in assembling of the rotating member 60 to the receiving bracket 40, the rotating plates 64 are deformed away from each other, to clamp the corresponding side plates 44 of the receiving bracket 40 from the top plate 43. The limiting pole 65 and the engaging piece 651 of each rotating plate 64 is inserted into the corresponding accesses 4462, and the shafts 444 are rotatably inserted into the corresponding shaft holes 643. Two screws extend through the shaft holes 643, to screw into the corresponding screw holes 4442. The limiting poles 65 are capable of being slid in the corresponding positioning slots 446, and each piece 651 is slidably abutted against an inner surface of the corresponding side plates 44 to prevent the corresponding limiting poles 65 from disengaging from the corresponding positioning slots 446. The rotating member 60 is capable of being rotated around the shafts 444. Each elastic piece 645 is positioned on an upper portion of the corresponding protrusion 448 to prevent the rotating member 60 from further rotation, thereby allowing to assemble the optical disk drive 300.

The optical disk drive 300 is inserted into the receiving space 45 from a front end of the receiving bracket 40. A bottom surface of the optical disk drive 300 is supported on the tabs 445, until the fastening holes 304 of the optical disk drive 300 are aligned with the corresponding through holes 447 of the receiving bracket 40. Screws extend through the through holes 447, to be fastened into the corresponding fastening holes 304.

The combination of the receiving bracket 40, the rotating member 60, and the optical disk drive 300 is attached to the positioning bracket 20. The positioning pins 442 are inserted into the corresponding slide slots 26 from the corresponding inserting portions 264, until the bottom plate 42 of the receiving bracket 40 is supported on the bottom wall 22 of the positioning bracket 20. When operation plate 62 operated to cause the rotating member 60 to rotate toward the positioning bracket 20, the elastic pieces 645 are respectively disengaged from the protrusions 448. The guiding pins 27 are slidably and respectively inserted into the slide portions 647b from the inserting portions 647c. The positioning pins 442 are respectively slid along the slide portions 262 from a rear end to a front end of the positioning bracket 20, until the guiding pins 27 are respectively latched into the positioning portions 647a. The elastic pieces 645 respectively pass by the protrusions 448 and are abutted against lower portions of the protrusions 448, to prevent the rotating member 60 from further rotation up. Each limiting pole 65 is slid in the corresponding positioning slot 446 from the access 4462 to a distal end of the positioning portion 4464 opposite to the access 4462. The optical disk drive 300 is thus fixed to the positioning bracket 20.

In disassembling the optical disk drive 300 from the positioning bracket 20, the operation plate 62 is pulled up, to rotate the rotating member 60 away from the positioning bracket 20. The guiding pins 27 are respectively slid into the slide portions 647b from the positioning portions 647a, and the elastic pieces 645 are respectively slid to the upper portions of the protrusions 448. The positioning pins 442 are respectively slid along the slide portion 262 from the front end to the rear end of the positioning bracket 20, until the guiding pins 27 are respectively disengaged from the guiding slots 647 and the positioning pins 442 are respectively aligned with the inserting portions 264. Therefore, the hard disk drive 300 can be easily removed from the positioning bracket 20.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mounting apparatus for a storage device, the mounting apparatus comprising:

a positioning bracket comprising two opposite end walls, each end wall defining a slide slot, a guiding pin protruding from each end wall;

a receiving bracket for receiving the storage device, the receiving bracket comprising two opposite side plates, each side plate forming a positioning pin to be slidably received in a corresponding one of the slide slots of the positioning bracket; and a rotating member comprising two rotating plates rotatably and respectively connected to the side plates of the receiving bracket, each rotating plate defining a guiding slot with a first positioning portion, wherein the guiding pins of the positioning bracket are slidably and respectively received in the guiding slots of the rotating plates, and when the rotating member is rotated in a first direction, guiding pins are slid in the corresponding guiding slot, the positioning pins are slid along the slide slots of the positioning bracket, until each guiding pin is positioned in the corresponding first positioning portion, such that the receiving bracket is fixed to the positioning bracket in order to mount the storage device once received in the receiving bracket;

wherein two opposite shafts extend out from upper portions of rear ends of the side plates, an extending portion extends rearward from a rear side of each rotating plate, each extending portion defines a shaft hole for rotatably receiving the corresponding shaft; and wherein a circular protrusion protrudes out from each side plate at a front end of the corresponding shaft, an elastic piece extends from each extending portion, to abut against the corresponding protrusion.

2. The mounting apparatus of claim 1, wherein the positioning bracket further comprises a bottom wall, the end walls perpendicularly extend up from two opposite ends of the bottom wall, each slide slot includes a slide portion extending along a direction parallel to the bottom wall, and an inserting portion extending up from a rear end of the slide portion and extending through a top side of a corresponding end wall, the positioning pins of the receiving bracket are slid into the corresponding slide portions from the corresponding inserting portions.

3. The mounting apparatus of claim 2, wherein the rotating member further comprises an operation plate, the rotating plates extend down from two opposite ends of the operation plate, a guiding portion extends forward from a front side of each rotating plate, the guiding slots are defined in inner surfaces of the corresponding guiding portions, the first positioning portion extends down from an upper portion of each guiding portion, each guiding slot comprises an arched slide portion extending forward and down from a bottom end of the first positioning portion, an opened inserting portion is defined in a distal end of the slide portion opposite to the first positioning portion, the guiding pins of the positioning bracket are inserted into the corresponding inserting portions and slid along the corresponding slide portions to latch the first positioning portions.

4. The mounting apparatus of claim 3, wherein the operation plate is rotated in a second direction opposite to the first direction, the guiding pin are respectively slid into the slide portions the guiding slot from the first positioning portions, the positioning pins are slid along the slide slots of the positioning bracket, until the guiding pin are respectively disengaged from the guiding slot and the positioning pins are respectively disengaged from the inserting portions, such that the receiving bracket is removed from the positioning bracket.

5. The mounting apparatus of claim 1, wherein two spaced recessed portions are defined in an outer surface of each side plate of the receiving bracket, a tab extends in from a lower portion of each recessed portion for supporting an optical disk drive, each recessed portion defines a plurality of through holes, screws extend through the through holes to fasten the optical disk drive.

6. The mounting apparatus of claim 5, wherein each side plate of the receiving bracket defines a positioning slot between the recessed portions, a limiting pole extends in from a lower portion of each rotating plate, and is slidably received in the corresponding positioning slot.

7. The mounting apparatus of claim 6, wherein an engaging piece extends out from a distal end of each limiting pole parallel to the rotating plate, to prevent the corresponding limiting pole from disengaging from the corresponding positioning slot.

8. The mounting apparatus of claim 6, wherein each positioning slot comprises an access defined in a upper portion of each side plate, and a second positioning portion obliquely extending down from a front end of the access, each limiting pole is slidably received in the corresponding second positioning portion from the corresponding access.

9. A mounting apparatus for a storage device, the mounting apparatus comprising: a positioning bracket comprising two opposite end walls, each end wall defining a slide slot, a guiding pin protruding from each end wall;
  a receiving bracket for receiving the storage device, the receiving bracket comprising two opposite side plates, each side plate forming a positioning pin to be slidably received in a corresponding one of the slide slots of the positioning bracket; and
  a rotating member comprising two rotating plates rotatably and respectively connected to the side plates of the receiving bracket, each rotating plate defining a guiding slot with a first positioning portion, wherein the guiding pins of the positioning bracket are slidably and respectively received in the guiding slots of the rotating plates, and when the rotating member is rotated in a first direction, guiding pins are slid in the corresponding guiding slot, the positioning pins are slid along the slide slots of the positioning bracket, until each guiding pin is positioned in the corresponding first positioning portion, such that the receiving bracket is fixed to the positioning bracket in order to mount the storage device once received in the receiving bracket; and
  wherein two spaced recessed portions are defined in an outer surface of each side plate of the receiving bracket, a tab extends in from a lower portion of each recessed portion for supporting an optical disk drive, each recessed portion defines a plurality of through holes, screws extend through the through holes to fasten an optical disk drive.

10. The mounting apparatus of claim 9, wherein the positioning bracket further comprises a bottom wall, the end walls perpendicularly extend up from two opposite ends of the bottom wall, each slide slot includes a slide portion extending along a direction parallel to the bottom wall, and an inserting portion extending up from a rear end of the slide portion and extending through a top side of a corresponding end wall, the positioning pins of the receiving bracket are slid into the corresponding slide portions from the corresponding inserting portions.

11. The mounting apparatus of claim 10, wherein the rotating member further comprises an operation plate, the rotating plates extend down from two opposite ends of the operation plate, a guiding portion extends forward from a front side of each rotating plate, the guiding slots are defined in inner surfaces of the corresponding guiding portions, the first positioning portion extends down from an upper portion of each guiding portion, each guiding slot comprises an arched slide portion extending forward and down from a bottom end of the first positioning portion, an opened inserting portion is defined in a distal end of the slide portion opposite to the first positioning portion, the guiding pins of the positioning bracket are inserted into the corresponding inserting portions and slid along the corresponding slide portions to latch the first positioning portions.

12. The mounting apparatus of claim 11, wherein the operation plate is rotated in a second direction opposite to the first direction, the guiding pin are respectively slid into the slide portions the guiding slot from the first positioning portions, the positioning pins are slid along the slide slots of the positioning bracket, until the guiding pin are respectively disengaged from the guiding slot and the positioning pins are respectively disengaged from the inserting portions, such that the receiving bracket is removed from the positioning bracket.

13. The mounting apparatus of claim 9, wherein two opposite shafts extend out from upper portions of rear ends of the side plates, an extending portion extends rearward from a rear side of each rotating plate, each extending portion defines a shaft hole for rotatably receiving the corresponding shaft.

14. The mounting apparatus of claim 9, wherein each side plate of the receiving bracket defines a positioning slot between the recessed portions, a limiting pole extends in from a lower portion of each rotating plate, and is slidably received in the corresponding positioning slot.

15. The mounting apparatus of claim 14, wherein an engaging piece extends out from a distal end of each limiting pole parallel to the rotating plate, to prevent the corresponding limiting pole from disengaging from the corresponding positioning slot.

16. The mounting apparatus of claim 14, wherein each positioning slot comprises an access defined in a upper portion of each side plate, and a second positioning portion obliquely extending down from a front end of the access, each limiting pole is slidably received in the corresponding second positioning portion from the corresponding access.

* * * * *